United States Patent Office 2,754,338
Patented July 10, 1956

2,754,338

DEHYDROALKYLATION OF NON-AROMATIC BICYCLIC HYDROCARBONS

Herman Pines, Evanston, Ill., assignor to Universal Oil Products Company, Des Plaines, Ill., a corporation of Delaware No Drawing. Application December 28, 1953,
Serial No. 400,784

13 Claims. (Cl. 260—668)

This invention relates to the dehydroalkylation of non-aromatic unsaturated bicyclic compounds and, more particularly, to the simultaneous dehydrogenation and alkylation of a non-aromatic unsaturated bicyclic compound with an olefinic hydrocarbon.

It is an object of this invention to provide a process for the dehydroalkylation of a non-aromatic unsaturated bicyclic compound by reacting said compound with an olefinic hydrocarbon at condensation conditions.

A further object of this invention is to provide a process for the simultaneous dehydrogenation and alkylation of a non-aromatic unsaturated bicyclic hydrocarbon by reacting said hydrocarbon with an olefinic hydrocarbon at condensation conditions in the presence of an alkali catalyst.

A specific object of this invention is to simultaneously dehydrogenate and alkylate a bicyclic terpene by reacting said terpene with an olefinic hydrocarbon in the presence of an alkali condensation catalyst at condensation conditions.

One embodiment of this invention relates to a process for the dehydroalkylation of a non-aromatic unsaturated bicyclic compound by reacting an olefinic hydrocarbon with said bicyclic compound at condensation conditions in the presence of an organometallic catalyst.

A further embodiment of this invention resides in a process for the dehydroalkylation of a non-aromatic unsaturated bicyclic hydrocarbon by reacting an olefinic hydrocarbon with said bicyclic hydrocarbon at condensation conditions in the presence of a catalyst selected from the group consisting of alkali metals and hydrides thereof, and an organic promoter capable of forming an organometallic compound, and recovering the resultant condensation product.

A still further embodiment of this invention is found in a process for dehydroalkylating a bicyclic terpene by reacting an olefinic hydrocarbon with a bicyclic terpene containing a 6-membered carbon atom ring and a ring selected from the group consisting of 3 and 4-membered carbon atom rings at condensation conditions in the presence of a catalyst selected from the group consisting of alkali metals and hydrides thereof, and an acetylenic hydrocarbon, and recovering the resultant condensation product.

Another embodiment of this invention is found in a process for the dehydroalkylation of a bicyclic terpene containing a 6-membered carbon atom ring and a ring selected from the group consisting of 3 and 4-membered carbon atom rings by reacting an olefinic hydrocarbon such as ethylene with said bicyclic terpene at condensation conditions in the presence of a catalyst selected from the group consisting of alkali metals and hydrides thereof, and a halogenated aromatic compound, and recovering the resultant condensation product.

Still another embodiment of this invention is found in a process for the dehydroalkylation of a bicyclic terpene containing a 6-membered carbon atom ring and a ring selected from the group consisting of 3 and 4-membered carbon atom rings by reacting an olefinic hydrocarbon with said bicyclic terpene at condensation conditions in the presence of a catalyst selected from the group consisting of alkali metals and hydrides thereof, and a heterocyclic compound containing a ring consisting of a nitrogen atom and at least 4 carbon atoms, and recovering the resultant condensation products.

A specific embodiment of this invention is found in a process for the dehydroalkylation of a bicyclic terpene containing a 6-membered carbon atom ring and a ring selected from the group consisting of 3 and 4-membered carbon atom rings by reacting an olefinic hydrocarbon such as ethylene with said bicyclic terpene at a temperature ranging from about 150° C. to about 275° C. in the presence of a catalyst selected from the group consisting of alkali metals and hydrides thereof, and a halogenated aromatic compound and recovering the resultant condensation product.

A specific embodiment of this invention resides in a process for dehydroalkylating a bicyclic terpene containing a 6-membered carbon atom ring and a ring selected from the group consisting of 3 and 4-membered carbon atom rings by reacting an olefinic hydrocarbon with said bicyclic terpene at a temperature ranging from about 150° C. to about 275° C. in the presence of a catalyst selected from the group consisting of alkali metals and hydrides thereof, and a polynuclear aromatic compound, and recovering the resultant condensation product.

A more specific embodiment of this invention resides in a process for the dehydroalkylation of α-pinene by reacting an olefinic hydrocarbon with said pinene at a temperature ranging from about 150° C. to about 275° C. or more, in the presence of a catalyst selected from the group consisting of alkali metals and hydrides thereof, and an organic promoter capable of forming an organometallic compound, and recovering the resultant condensation product.

A still more specific embodiment of this invention is found in a process for dehydroalkylating α-pinene by reacting ethylene with said pinene at temperatures ranging from about 150° C. to about 275° C. in the presence of a catalyst comprising sodium and o-chlorotoluene, and recovering the resultant p-t-amyltoluene.

Other objects and embodiments of this invention referring to alternative unsaturated bicyclic terpenes, alternative olefinic hydrocarbons and alternative alkali metals and hydrides will be referred to in the following further detailed description of the invention.

It has now been discovered that the simultaneous dehydrogenation and alkylation of bicyclic terpenes which results in a ring rupture of the terpene and the formation of aromatic hydrocarbons containing alkyl substituents on the ring can be effected by reacting said terpene with an olefinic hydrocarbon in the presence of a catalyst comprising an alkali metal or a hydride thereof and an organic compound capable of reacting with said alkali metal or hydride thereof to form an organometallic compound. The bicyclic terpenes which may be used in the process include those terpenes containing a 6-membered carbon atom ring and a 3 or 4-membered carbon atom ring. Examples of these compounds include α-pinene, β-pinene, α-sabinene, β-sabinene, α-thujene, β-thujene, δ-dihydrocariphyllene, etc. The 3 or 4-membered carbon atom rings of the bicyclic terpene may or may not contain alkyl substituents such as mono or dimethyl radicals. It has now been found that the 3 or 4-membered carbon atom rings will rupture when an olefinic hydrocarbon is reacted with said terpene in the presence of alkali metal catalysts and the olefinic hydrocarbon will add to the carbon atom which was formerly linked to two carbon atoms of the 6-membered carbon atom ring.

The unsaturated organic compounds which are olefinic in character and which may be used in this process include monoolefins such as ethylene, butylene, amylene, etc. Diolefins such as 1,3-butadiene, 1,3-pentadiene, etc. may also be used and are selected for the length of the side chain desired in the final product. Polyolefins may also be used in this process although not necessarily with equivalent results.

The dehydrogenation and rupture of the ring is carried out in the presence of catalysts including alkali metals and alkaline earth metals or their hydrides. For purposes of this invention the term "alkali metal" when pertaining to a catalyst, embraces both alkali metals and alkaline earth metals such as sodium, potassium, magnesium, lithium, strontium, rubidium, cesium, barium, or calcium. The hydrides of these metals include calcium hydride, barium hydride, strontium hydride, lithium hydride, sodium hydride, potassium hydride, magnesium hydride, etc. and mixtures thereof such as calcium-lithium hydride, calcium-barium hydride, lithium-potassium hydride, sodium-lithium hydride, etc. Other metallic hydrides which may be used for catalysts in this reaction, although not falling within the class of alkali metals, include aluminum hydride or combinations of aluminum hydride with any of the aforesaid alkali or alkaline earth metals including lithium-aluminum hydride, calcium-aluminum hydride, sodium-aluminum hydride, etc. Metalloid hydrides such as boron hydride may also be used within the scope of this invention, although not necessarily with equivalent results. Combinations of catalysts containing dehydrogenating properties may also be used. Such combinations include the combinations of nickel and sodium, molybdenum oxide and sodium, chromium oxide and sodium, nickel and sodium hydride, nickel and potassium hydride, molybdenum oxide, and potassium hydrides, etc.

The reaction of the present invention is promoted by the addition of small amounts of compounds which are capable of forming an organometallic compound with the metallic catalyst during the reaction. These organic promoters which combine with a metal to form the aforesaid organometallic compounds include polynuclear aromatic hydrocarbons such as anthracene, dihydroanthracene, fluorene, phenanthracene, tetralin, and the like; heterocyclic compounds containing rings consisting of a nitrogen atom and at least 4 but not more than 5 carbon atoms such as pyridine, picoline, and other alkyl pyridines, quinoline, isoquinoline, and various alkylated quinolines and isoquinolines, piperidine, pyrrole, etc.; organic peroxide compounds such as acetyl peroxide, benzoyl peroxide, di-t-butyl peroxide, di-t-butyl hydroperoxide, tetralin hydroperoxide, methyl cyclopentyl hydroperoxide, dimethyl cyclopentyl hydroperoxide, etc.; acetylenic compounds such as acetylene, methylacetylene, ethylacetylene, pentyne, hexyne, heptyne, etc.; halogenated aromatic compounds such as o-chlorotoluene, o-bromotoluene, o-chloroethylbenzene, o-chloropropylbenzene, o-bromoethylbenzene, etc. In addition, the catalyst may include combinations of alkali metal or several alkali metals and at least one organometallic compound. The organometallic compounds which are useful in this process are reactive metal compounds in which a valence bond of the metal is combined directly with a carbon atom of the hydrocarbon radical. Organometallic compounds such as these include lead tetraalkyls, lead tetraaryls, lead alkylaryls, zinc aryls, mercury dialkyls and diaryls, tin tetraalkyl and the like. Alkyl metal halides such as alkyl lead chloride, aryl metal halides such as phenyl mercury chloride and the like may be used. In the present invention, sodium and potassium are generally preferred due to the relatively lower cost and availability of these metals. The amount of alkali metal and the organic promotor used are dependent upon the particular unsaturated bicyclic terpenes being reacted. In general, an excess of alkali metals over the organic compound capable of forming an organometallic compound is employed, thus insuring the presence of free metal as well as an organometallic salt. Better contacting of the reactants and the catalysts for improved yields of the desired products are sometimes effected by use of a catalyst support or supporting material such as activated charcoal, granular coke, silica alumina, pumice, porcelain, quartz, steel turnings, copper shot, etc., which do not have an advantageous influence on the reaction but improve the mixing. Such spacing materials are used in either batch type operations as an autoclave, or in continuous treatment as in a tubular reactor or other suitable apparatus.

The process of this invention may be carried out using either a batch or continuous type of operation in suitable equipment such as an autoclave or tubular reactor constructed from steel or glass lined steel reactors. The process is carried out at a temperature in the range of from about 100° C. to about 400° C. and preferably at a temperature in the range of from about 150° C. to about 275° C. Superatmospheric pressure ranging from about 5 to about 200 atmospheres are used, the preferred range being from about 5 to about 50 atmospheres. When the stirring or mixing of the reactants and the catalysts is very thorough and efficient, the process may be carried out readily at a temperature of approximately 175° C. and a pressure of 5 atmospheres, but higher temperatures and pressures are preferred when the mixing is less efficient. The operating temperature and pressure will be dependent upon the bicyclic terpenes and the olefinic hydrocarbons charged and upon the ratio of reactants present in the reaction zone as well as upon the catalyst present.

In order to promote the primary alkylation and to decrease the loss of the olefinic hydrocarbons through undesired side reactions, it is generally preferred to employ an excess of bicyclic terpenes to olefinic hydrocarbons in the process. In other words, the preferred ratio of bicyclic terpenes to olefinic hydrocarbons is greater than one. The amount of catalyst used in this process is dependent upon the nature and reactivity of the unsaturated bicyclic terpene undergoing dehydrogenation and alkylation and upon the nature of the olefinic hydrocarbon used as the alkylating agent. In addition, the particular catalyst promoter (the organic compound capable of reacting with the alkali metal to form an organometallic compound) present in the reaction mixture has an influence upon the amount of alkali metal necessary for the efficient operation of the process. In general, from about 0.05 to about 0.5 atomic proportion of alkali metal are present per molecular proportion of unsaturated bicyclic terpene present in the reaction zone.

When a batch type operation is used, a quantity of the bicyclic terpenes and catalyst comprising the alkali metal and the organic promotor is placed in a reaction vessel equipped with gas introducing and mixing devices. The olefinic hydrocarbon is then charged to the reaction vessel while the reactants are thoroughly admixed. After the reaction has reached the desired stage of completion, the reaction products are discharged from the autoclave, the unconverted bicyclic terpenes being recovered for further use in the processor utilized for some other purpose. The mixture of reaction products is then subjected to suitable separation treatment such as filtration to remove any unconsumed alkali metal catalysts followed by fractional distillation of the normally liquid products, to separate the unconverted charge stock from the alkylated products and higher boiling material, the latter being sometimes formed as a by-product of the reaction. In carrying out the process, the olefinic hydrocarbon charged to the reactor may be introduced continuously or intermittently, the latter method being commonly employed in the usual type of batch operation conducted in an autoclave so that the consumption of the olefinic hydrocarbon may be followed by the decrease in operating pressure in the autoclave as the reaction progresses.

Another method of operation of the present process is of the continuous type. A particularly suitable type of operation comprises a fixed bed type in which the catalyst is disposed as a bed in a reaction zone provided with gas inlet means while the bicyclic terpene is passed therethrough in either an upward or downward flow while being subjected to the action of the olefinic hydrocarbon being admitted into the reactor through separate means. The bicyclic terpenes may be heated while in the reaction zone or may be heated prior to their admittance into said zone and kept at the desired temperature while therein. The reaction products are withdrawn from the zone and subjected to fractional distillation to separate out the desired end products while the unconverted bicyclic terpenes and the olefinic hydrocarbons may be recycled for further use as charge stocks in the process.

Another continuous type process is the fluidized type of operation in which the bicycle terpenes and the catalysts are maintained in a state of turbulence under hindered settling conditions in a reaction zone while the olefinic hydrocarbon is admitted thereto. Other continuous types of processes include the compact moving bed type of operation in which the catalyst and the bicyclic terpenes pass either concurrently or countercurrently to each other, and the slurry type process in which the catalyst is carried into the reaction zone as a slurry in the bicyclic terpene. In each of the aforementioned types of processes the olefinic hydrocarbon is admitted to said zone and recycled in the event that any unconverted olefin is still present at the end of the reaction.

The dehydroalkylated compounds, and particularly aromatic hydrocarbons formed in this process are useful as starting materials for the production of wetting agents, synthetic detergents, and the like. Some of the other condensation products formed by this process are also useable as intermediates in the production of chlorinated alkylaryl hydrocarbons which are useful as insecticides, and the condensation products may also be used as intermediates in the production of dyes, pharmaceuticals, etc.

The following examples are given to illustrate the process of the invention which, however, are not intended to limit the generally broad scope of the present invention in strict accordance therewith.

*Example I*

68 g. of α-pinene, 1 g. of o-chlorotoluene, and 5 g. of sodium were placed in a glass liner of an autoclave containing 25 ml. of glass beads, said liner being provided with a stopper containing a capillary opening. On completing the addition of the aforementioned reactants and catalysts the liner was inserted in a 450 ml. rotating autoclave and charged with 25 atmospheres of ethylene. The temperature of the autoclave was raised to 250° C. and maintained thereat for a period of 2 hours, after which the liner and the contents thereof were allowed to cool to room temperature. The final pressure at room temperature of the liner was 20 atmospheres. The contents of the liner were diluted to facilitate the settling of a dark brown sludge present in the reaction metal. The upper layer was decanted from the sludge, the sludge again diluted and the upper layer again decanted until two portions of the upper layer were combined and subjected to fractional distillation, a cut boiling between 212° and 217° C. was then separated off and subjected to analysis. This cut had a refractory index of $n_D^{20}=1.4915$ and corresponded to p-t-amyltoluene.

*Example II*

A quantity of 65 g. of β-pinene, 1 g. of o-chloro-toluene and 5 g. of potassium are placed in an apparatus corresponding to that hereinbefore described in Example I. The autoclave is heated to a temperature of approximately 250° C. for a period of two hours. During this time the autoclave is charged with 25 atmospheres of propylene.

At the end of the reaction time the liner and contents thereof are cooled to room temperature, diluted and the upper layer separated off. The upper layer is subjected to fractional distillation and a cut consisting of p-t-hexyltoluene is separated therefrom.

I claim as my invention:

1. A process for the dehydroalkylation of a bicyclic terpene containing a 6-membered carbon atom ring and a ring selected from the group consisting of 3 and 4-membered carbon atom rings, which comprises reacting an olefinic hydrocarbon with said bicyclic terpene in the presence of a catalyst selected from the group consisting of alkali metals and their hydrides, and an organic promoter compound capable of forming an organometallic compound with said catalyst, and recovering the resultant condensation product.

2. A process for the dehydroalkylation of an unsaturated bicyclic terpene containing a 6-membered carbon atom ring and a ring selected from the group consisting of 3 and 4-membered carbon atom rings, which comprises reacting an olefinic hydrocarbon with said bicyclic terpene at a temperature ranging from about 100° C. to about 400° C. in the presence of a catalyst selected from the group consisting of alkali metals and their hydrides, and an organic promoter compound capable of forming an organometallic compound with said catalyst, and recovering the resultant condensation products.

3. A process for the dehydroalkylation of an unsaturated bicyclic terpene containing a 6-membered carbon atom ring and a ring selected from the group consisting of 3 and 4-membered carbon atom rings which comprises reacting an olefinic hydrocarbon with said bicyclic terpene at a temperature ranging from about 150° C. to about 275° C. in the presence of a catalyst selected from the group consisting of alkali metals and their hydrides, and an organic promoter compound capable of forming an organometallic compound with said catalyst, and recovering the resultant condensation products.

4. A process for the dehydroalkylation of an unsaturated bicyclic terpene containing a 6-membered carbon atom ring and a ring selected from the group consisting of 3 and 4-membered carbon atom rings, which comprises reacting an olefinic hydrocarbon with said bicyclic terpene at temperatures ranging from about 150° C. to about 275° C. in the presence of a catalyst selected from the group consisting of alkali metals and their hydrides, and an acetylenic hydrocarbon, and recovering the resultant condensation product.

5. A process for the dehydroalkylation of an unsaturated bicyclic terpene containing a 6-membered carbon atom ring and a ring selected from the group consisting of 3 and 4-membered carbon atom rings, which comprises reacting an olefinic hydrocarbon with said bicyclic terpene at temperatures ranging from about 150° C. to about 275° C. in the presence of a catalyst selected from the group consisting of alkali metals and their hydrides, and a heterocyclic compound containing a ring consisting of a nitrogen atom and at least 4 carbon atoms, and recovering the resultant condensation product.

6. A process for the dehydroalkylation of an unsaturated bicyclic terpene containing a 6-membered carbon atom ring and a ring selected from the group consisting of 3 and 4-membered carbon atom rings, which comprises reacting an olefinic hydrocarbon with said bicyclic terpene at temperatures ranging from about 150° C. to about 275° C. in the presence of a catalyst selected from the group consisting of alkali metals and their hydrides, and a halogenated aromatic hydrocarbon, and recovering the resultant condensation product.

7. A process for the dehydroalkylation of an unsaturated bicyclic terpene containing a 6-membered carbon atom ring and a ring selected from the group consisting of 3 and 4-membered carbon atom rings, which comprises reacting an olefinic hydrocarbon with said bicyclic terpene at temperatures ranging from about 150° C. to about 275° C. in the presence of a catalyst selected from the group consisting of alkali metals and their hydrides and a polynuclear aromatic hydrocarbon, and recovering the resultant condensation product.

8. A process for the dehydroalkylation of an unsaturated bicyclic terpene containing a 6-membered carbon atom ring and a ring selected from the group consisting of 3 and 4-membered carbon atom rings, which comprises reacting an olefinic hydrocarbon with said bicyclic terpene at temperatures ranging from about 150° C. to about 275° C. in the presence of a catalyst selected from the group consisting of alkali metals and their hydrides, and an organic peroxide, and recovering the resultant condensation product.

9. A process for the dehydroalkylation of α-pinene which comprises reacting an olefinic hydrocarbon with said pinene at temperatures ranging from about 150° C. to about 275° C. in the presence of a catalyst selected from the group consisting of alkali metals and hydrides thereof and an organic promoter compound capable of forming an organometallic compound with said catalyst, and recovering the resultant condensation product.

10. A process for the dehydroalkylation of α-pinene which comprises reacting ethylene with said pinene at a temperature ranging from about 150° C. to about 275° C. in the presence of a catalyst selected from the group consisting of alkali metals and hydrides thereof, and an organic promoter compound capable of forming an organometallic compound with said catalyst, and recovering the resultant p-t-amyltoluene.

11. A process for the dehydroalkylation of α-pinene which comprises reacting ethylene with said pinene at a temperature ranging from about 150° C. to about 275° C. in the presence of a catalyst comprising sodium and an organic promoter compound capable of forming an organometallic compound with sodium, and recovering the resultant p-t-amyltoluene.

12. A process for the dehydroalkylation of α-pinene which comprises reacting ethylene with said pinene at temperatures ranging from about 150° C. to about 275° C. in the presence of a catalyst comprising potassium and an organic promoter compound capable of forming an organometallic compound with potassium, and recovering the resultant p-t-amyltoluene.

13. A process for the dehydroalkylation of α-pinene which comprises reacting ethylene with said pinene at a temperature ranging from about 150° C. to about 275° C. in the presence of a catalyst comprising sodium and o-chlorotoluene, and recovering the resultant p-t-amyltoluene.

References Cited in the file of this patent

UNITED STATES PATENTS

| | | |
|---|---|---|
| 2,448,641 | Whitman | Sept. 7, 1948 |
| 2,548,803 | Little | Apr. 10, 1951 |